United States Patent [19]

Noguchi

[11] 3,984,777
[45] Oct. 5, 1976

[54] CARRIER WAVE REPRODUCER DEVICE FOR USE IN THE RECEPTION OF A MULTI-PHASE PHASE-MODULATED WAVE

[75] Inventor: Toshitake Noguchi, Tokyo, Japan

[73] Assignee: Nippon Electric Company, Ltd., Tokyo, Japan

[22] Filed: Sept. 25, 1975

[21] Appl. No.: 616,512

Related U.S. Application Data

[63] Continuation-in-part of Ser. No. 462,839, April 22, 1974, abandoned.

[30] Foreign Application Priority Data

Apr. 20, 1973 Japan................. 48-45269
July 4, 1973 Japan................. 48-75975
July 4, 1973 Japan................. 48-75976

[52] U.S. Cl.............................. 325/320; 178/88; 178/69.5 R
[51] Int. Cl.² ...................................... H04B 1/16
[58] Field of Search ............ 325/30, 320, 474, 476; 178/66 R, 67, 88, 69.5 R; 329/104, 110, 116; 179/15 BS

[56] References Cited
UNITED STATES PATENTS

| | | | |
|---|---|---|---|
| 3,737,578 | 6/1973 | Matsuo | 325/320 |
| 3,769,587 | 10/1973 | Matsuo et al. | 325/320 |
| 3,815,034 | 6/1974 | Kato | 325/320 |
| 3,826,990 | 7/1974 | Pera | 325/320 |

Primary Examiner—Robert L. Griffin
Assistant Examiner—Jin F. Ng
Attorney, Agent, or Firm—Sughrue, Rothwell, Mion, Zinn and Macpeak

[57] ABSTRACT

A carrier wave reproducer device for use in the reception of a multi-phase digital phase-modulated waves for rapidly extracting the carrier wave without the generation of frequencies higher than the carrier frequency is disclosed. In its simplest embodiment, the device employs a delay detector and a cumulative adder circuit to derive a demodulated signal and a modulator for inversely modulating the input multi-phase digital phase-modulated wave with said demodulated signal. The reference carrier wave is then obtained from the output of the modulator. The same principle is used in alternative embodiments used in the reception of a burst form of signal transmitted with a preamble word having a specific pattern. These alternative embodiments take advantage of the preamble word generally included in a burst form of signal by additionally employing a demodulator for demodulating the input multi-phase digital phase-modulated wave through synchronized detection by making use of the reference carrier wave obtained from the modulator. In addition, a switching circuit is employed to supply the modulator with the demodulated output from the adder circuit at the beginning of reception of the phase-modulated wave, but after the reference carrier wave has been established, to supply the modulator with the output of the demodulator.

6 Claims, 17 Drawing Figures

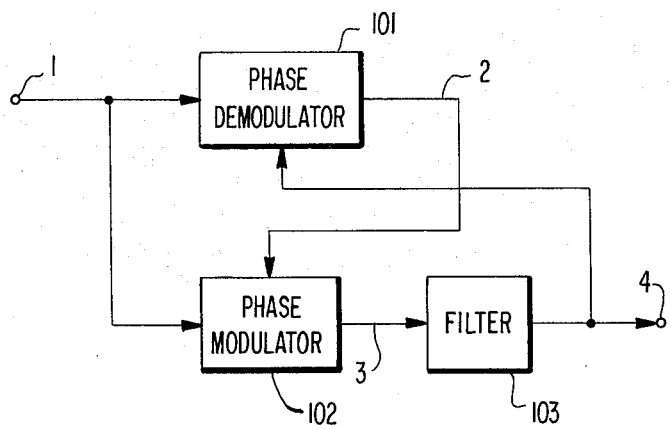
FIG. 1
PRIOR ART
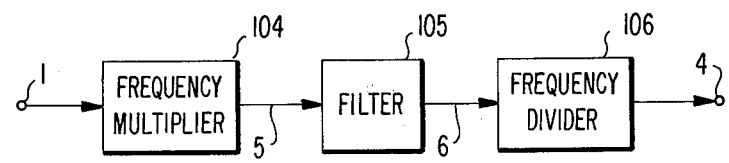
FIG. 2
PRIOR ART
FIG. 3
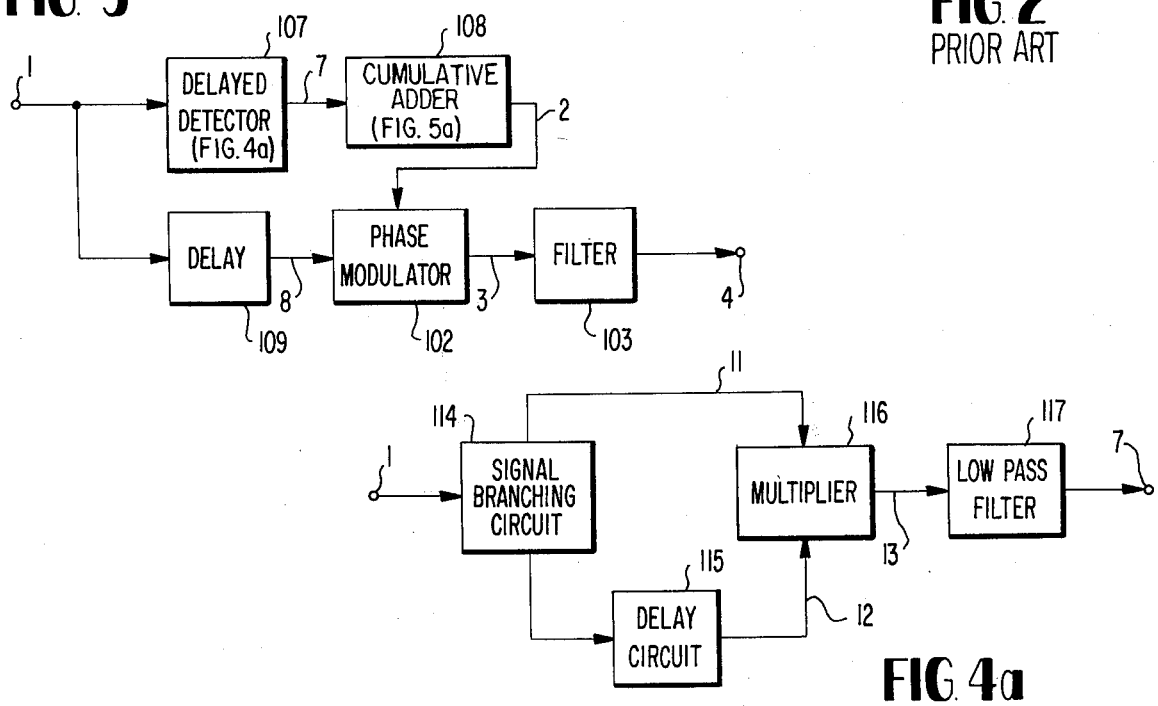
FIG. 4a
DELAYED DETECTOR 107
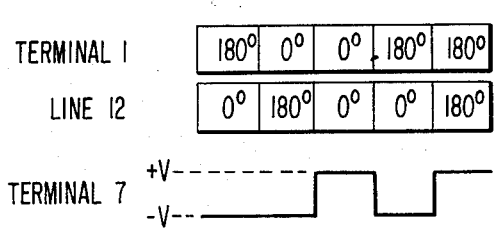
FIG. 4b

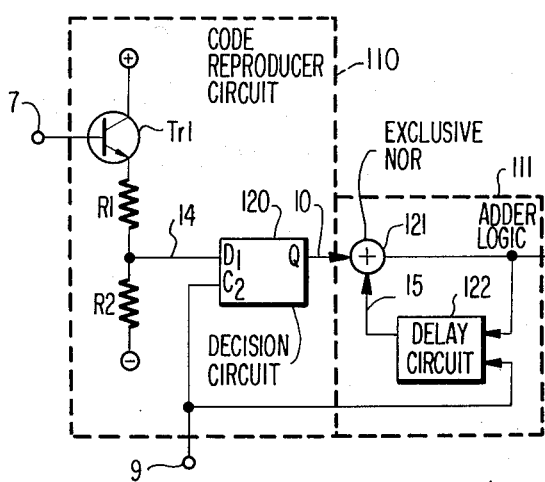
FIG. 5a
CUMULATIVE ADDER 108
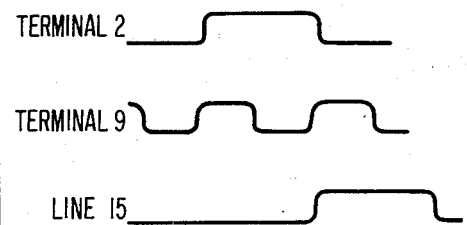
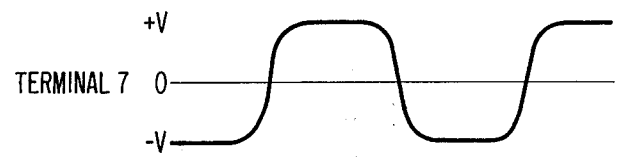
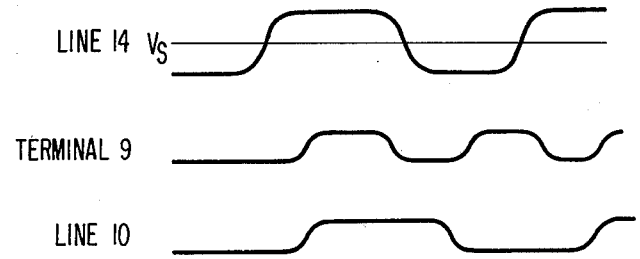
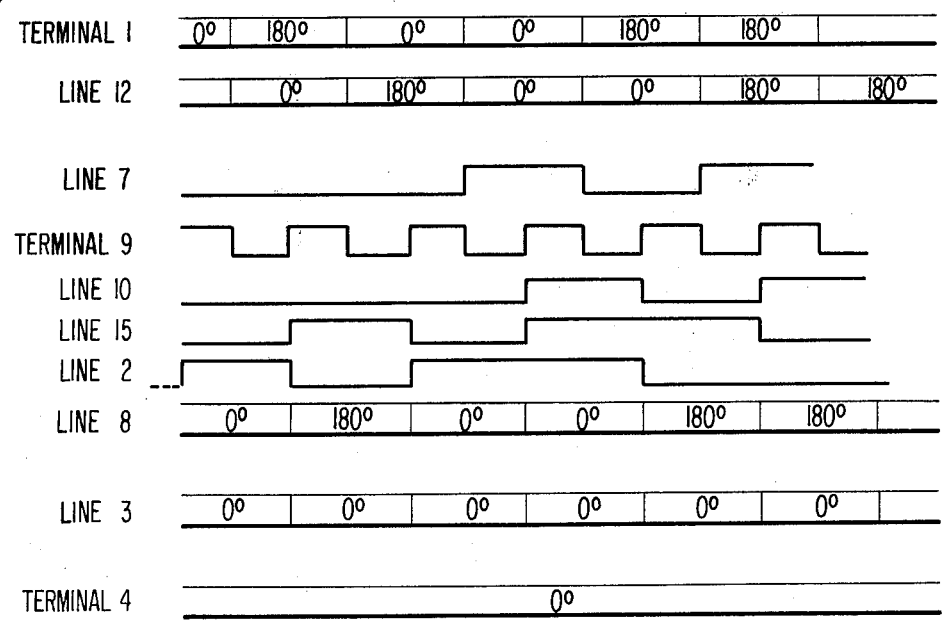

CLOCK SIGNAL
EXTRACTING CIRCUIT 305

PREAMBLE WORD
GENERATOR 306

CARRIER WAVE REPRODUCER DEVICE FOR USE IN THE RECEPTION OF A MULTI-PHASE PHASE-MODULATED WAVE

CROSS-REFERENCE TO RELATED APPLICATION

The benefit of 35 U.S.C. 120 is claimed for all subject matter commonly disclosed in this and copending application Ser. No. 462,839, filed Apr. 22, 1974, now abandoned.

BACKGROUND OF THE INVENTION

1. Field of the Invention

The present invention relates to a carrier wave reproducer device for use in the reception of a multi-phase digital phase-modulated wave suited particularly for the reception of a phase-modulated wave in a burst form.

2. Description of the Prior Art

In a digital radio communication system, it has been known that an N-phase (N being a positive integer of two or more) digital phase-modulation system is a system superior to other transmission systems. As a demodulation system for the N-phase digital phase-modulated wave, there are known a synchronized detection system in which a reference carrier wave synchronized in phase with the carrier wave of the input phase-modulated wave is reproduced on the receiver side and the demodulation is achieved through synchronized detection by making use of said reproduced carrier wave, and a delayed detection system in which the input digital phase-modulated wave is compared in phase with a delayed input modulated wave which has been shifted on a time axis by one time slot with respect to the first said input digital phase-modulated wave and thereby the demodulation is achieved. The former system has the disadvantage that it requires a reference carrier wave reproducer circuit although it is more excellent in performance against noise, while the latter system has the advantage that it does not require the reference carrier wave reproducer circuit although its performance against noise is poor. In addition, in contrast to the fact that the signal detected by the former system corresponds to the modulation phase in every time slot of the input phase-modulated wave, the signal detected by the latter system corresponds to the modulation phase difference between the successive time slots of the input phase-modulated wave. Consequently, the signal detected by the latter system is correlated to the signal demodulated by the former system in such a manner that the signals detected by the latter system in the successive time slots are added by means of an adder and thereby equalized to the signal demodulated by the former system.

Among the reference carrier wave reproducer circuits for reproducing a carrier wave to be applied to a demodulator in said synchronized detection system, an inverse modulation system and a frequency multiplier system have been heretofore known as representative ones. The inverse modulation system is constructed in such a manner that there are provided an N-phase phase-demodulator adapted to demodulate the input N-phase phase-modulated wave by means of the reproduced reference carrier wave, and an N-phase inverse phase-modulator adapted to cancel the phase shift of the input N-phase phase-modulated wave with the output of said demodulator, and that the reference carrier wave may be obtained from the output of said inverse modulator. On the other hand, the frequency multiplier system is constructed in such a manner that the input N-phase phase-modulated wave is multiplied in frequency by a factor of N by means of a frequency multiplier to derive an unmodulated wave having a frequency N times as high as the carrier frequency from the output of said frequency multiplier, and thereafter a reference carrier wave having a frequency equal to the input carrier frequency may be reproduced by means of a 1/N frequency divider.

In recent applications of digital radio communication techniques to satellite communication systems and the like, the so-called "TDMA (Time Division Multiple Access) system" has been commonly used, in which a carrier wave is switched on and off intermittently to be transmitted in the so-called burst form, and in which a plurality of stations transmit signals in a time division fashion along the time axis. When the synchronized detection system is applied to such communication systems for receiving and demodulating the modulated waves, the necessity for reproducing a reference carrier wave occurs every time the burst signal is received. For that purpose, normally a specific pattern of signal for use in the reproduction of a carrier wave, so-called "preamble work", is added to the beginning of the burst form of input signal. If this additional signal becomes longer, the efficiency of the transmission line is deteriorated, so that the carrier wave reproduction cannot be established within a minimum time. The time needed for the establishment of the carrier wave reproduction is called "acquisition time". It is to be noted that the preamble word generally includes a pattern common to all the stations and a pattern characteristic of the individual station in addition to said specific pattern for the establishment of said synchronizing relationship. If the inverse modulation system is employed as a carrier wave reproducer circuit for the above-described communication system, then in the beginning of the reception of the burst signal, that is, in the acquisition time, the reference carrier wave will not be fully established in this reproducer circuit, so that the N-phase phase-demodulation in the N-phase phase demodulator is incomplete and thus the inverse modulation in the N-phase inverse phase-modulator is also incomplete. Consequently, the inverse modulation system had a disadvantage that the acquisition time was prolonged because of these incompletions. On the other hand, if the frequency multiplier system is employed, though it has the advantage that the incompletion of operation during the acquisition time, as is the case with the inverse modulation system, does not exist, it has the disadvantage that a frequency N times as high as the reference carrier frequency must be dealt with and thus the circuit design is more difficult.

SUMMARY OF THE INVENTION

It is an object of the present invention to provide a carrier wave reproducer device for use in the reception of multi-phase digital phase-modulated waves, in which carrier wave extraction can be established within a short period of time even for a burst signal, and in which there is no need to deal with a frequency higher than the carrier frequency.

According to the present invention, there is provided a carrier wave reproducer device comprising demodulator means for demodulating an input multi-phase digital phase-modulated wave in a burst form by the intermediary of a delay detector and a cumulative adder circuit to derive a demodulated signal, and modulator means for inversely modulating the input multiphase digital phase-modulated wave with said demodulated signal, whereby a reference carrier wave for the input modulated wave may be obtained from the output of said modulator means.

BRIEF DESCRIPTION OF THE DRAWINGS

Other features and advantages of the present invention will become apparent upon a perusal of the description taken in connection with the accompanying drawings wherein:

FIG. 1 is a schematic block diagram showing a carrier wave reproducer device according to the inverse modulation system in the prior art;

FIG. 2 is a schematic block diagram showing a carrier wave reproducer device according to the frequency multiplier system in the prior art;

FIG. 3 is a schematic block diagram showing a first embodiment of the carrier wave reproducer device according to the present invention;

FIGS. 4a and 4b, respectively, show an example of the detailed structure of a delayed detector circuit in the carrier wave reproducer device in FIG. 3 and a diagrammatic view for explaining the operation of said delayed detector circuit;

FIGS. 5a, 5b and 5c, respectively, show an example of the detailed structure of a cumulative adder circuit in the carrier wave reproducer device in FIG. 3 and waveform diagrams of the signals appearing at various protions in said adder circuit;

FIG. 6 is a time chart diagrammatically representing the operations at various parts of the carrier wave reproducer circuit according to the present invention as illustrated in FIGS. 3 to 5;

DESCRIPTION OF THE PREFERRED EMBODIMENTS

Figure 7:
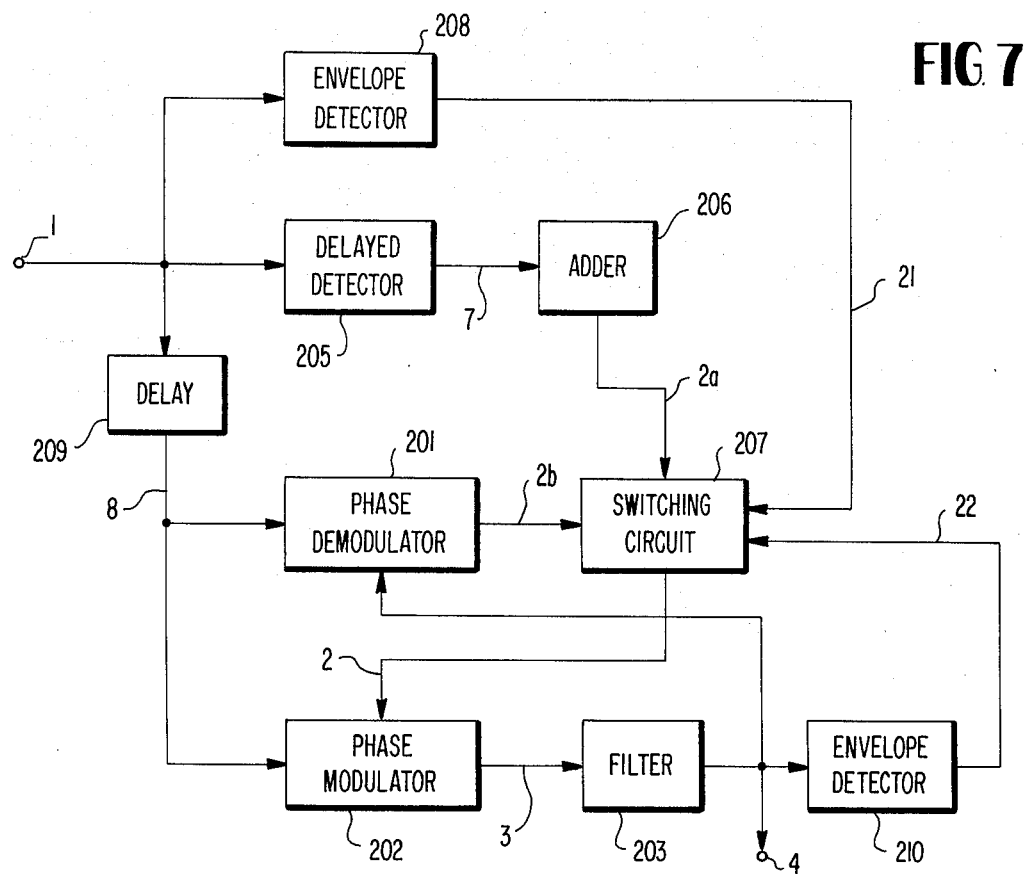
FIG. 7 is a schematic block diagram showing a second embodiment of the carrier wave reproducer device according to the present invention.

Referring to FIG. 1 showing a carrier wave reproducer device according to the inverse modulation system in the prior art, a modulation signal of an input N-phase phase-modulated wave is applied at terminal 1 and demodulated in an N-phase phase-demodulator 101 by making use of a carrier wave appearing at terminal 4 as a reference8c to provide a demodulated output on line 2. Using this demodulated output on line 2, the input N-phase phase-modulated wave at terminal 1 is inversely phase-modulated in an N-phase phase-modulator 102 so that the modulated phase may be restored to the original phase. The unmodulated wave on line 3 derived by said modulator 102 is passed through a narrow-band filter 103 such as, for example, a single resonant circuit, a phase synchronizing loop or the like. Filter 103 is required because the signal on line 103 has disturbances caused by noises, pattern jitters upon modulations, etc. Thus, the reproduced carrier wave at terminal 4 having its disturbance components suppressed in obtained.

Referring next to FIG. 2 showing a carrier wave reproducer device according to the frequency multiplier system in the prior art, an input N-phase phase-modulated wave appearing at terminal 1 is multiplied in frequency by a factor of N in an N-times frequency multiplier 104 to obtain an unmodulated signal on line 5 from an output of said multiplier. Since this unmodulated signal on line 5 has disturbances caused by noises, pattern jitters upon modulation, etc., said unmodulated signal is passed through a narrow-band filter 105 to remove the disturbance components, and thereby a carrier wave on line 6 can be obtained. However, since the frequency of this carrier wave on line 6 is N times as high as the carrier wave frequency of the input modulated wave at terminal 1, a reproduced carrier wave at terminal 4 can be obtained by dividing its frequency by a factor of 1/N in an 1/N frequency divider 106.

Upon the application of said inverse modulation system in FIG. 1 and said frequency multiplier system in FIG. 2, respectively, to the reception of an N-phase phase-modulated signal in a burst form, it will be readily appreciated from the constructions and operations of these systems that said inverse modulation system has a disadvantage that during the acquisition time of the burst signal the reference carrier wave has not yet been established completely, and that said frequency multiplier system has a disadvantage that a frequency N times as high as the carrier frequency must be dealt with.

Now referring to FIG. 3 showing one example of the carrier wave reproducer device according to the present invention, an input N-phase phase-modulated wave appearing at terminal 1 is subjected to delayed detection in an N-phase delayed detector 107 to obtain a delayed detector output on line 7. This delayed detector 107 functions to obtain a detected signal corresponding to the phase difference of the input N-phase phase-modulated wave at terminal 1 between successive two time slots on a time axis of said input wave. In order to facilitate understanding of the operation principle of the present invention, reference is made to FIG. 4a which illustrates a two-phase delayed detector as one practical example of said N-phase phase-modulated detector 107. In this two-phase delayed detector, an input two-phase phase-modulated wave at terminal 1 is applied to a signal branching circuit 114. The signal branching circuit 114 consists of, for instance, a hybrid circuit composed of resistors in which the input signal at terminal 1 appears at its outputs as two branched signals in phase with each other. One of the output signals is delayed in a delay circuit 115 by a period of one bit which depends upon the modulation rate of the input signal. Practically, as the delay circuit 115, there is employed, for example, a coaxial cable, and the delayed signal on line 12 is applied to a multiplier 116 which also receives the other output signal on line 11 of the branching circuit 114 without any delay. As the multiplier 116, for example, a balanced type of mixer circuit can be employed. Since an output signal on line 13 from the multiplier 116 contains higher harmonic components besides the delayed detection signal, said higher harmonic components are removed by a low-pass filter circuit 117 to obtain a pure delayed detection signal at terminal 7.

Now the operation of the above-described two-phase delayed detector will be described with reference to FIG. 4b which shows the timing relation of said operation. Assuming that the input two-phase phase-modulated wave at terminal 1 is a phase-modulated wave having a phase variation for its successive bits of, for instance, 180°, 0°, 0°, 180°, 180°, . . . , then the signal on line 12 having a delay of one bit has a series of phases of 0°, 180°, 0°, 0°, 180° . . . because said signal is delayed by one bit with respect to the input signal at terminal 1. Upon comparing said two signals with each other in the multiplier 116, if signals having the same phase are applied to said multiplier 116, the an output signal of +V is obtained as a detector output signal at terminal 7, whereas if the two signals applied to the multiplier 116 have a phase shift of 180° with respect to each other, then an output signal of −V is obtained as the output signal at terminal 7. In other words, when a phase transition occurs between the successive bits of the input signal at terminal 1, an output signal of −V is provided, whereas when there is no phase transition, an output signal of +V is provided.

Again referring to FIG. 3, the detector output signal on line 7 of the N-phase delayed detector 107 is applied to a cumulative adder 108 and from its output is obtain a demodulated signal on line 2 of the N-phase phase-modulated wave. Referring now to FIG. 5a which shows one example of the detailed structure of the cumulative adder 108, the N-phase delayed detector signal at terminal 7 is code-reproduced in a code reproducer circuit 110 by a clock signal applied to terminal 9 which has been separately derived from the input modulated wave. Generally, the N-phase delayed detector output at line 7 is not rectangular but has some distortion due to the limited bandwidth and noise involved in the radio transmission line. Need arises, therefore, for the reproduction of a distortion-free coded pulse signal. The N-phase delayed detector signal at terminal 7 is applied to the base of a transistor $Tr_1$ in this code reproducer circuit 110, and after it has been converted in level, an output on line 14 from the junction between emitter resistors $R_1$ and $R_2$ of said transistor is fed to a decision circuit 120. In the decision circuit 120, when the clock signal 9 changes from its lower level to its higher level, the code is decided depending upon whether the input signal on line 14 is higher or lower than a threshold voltage $V_s$, and thereby a reproduced code output on line 10 is obtained. These reproduced code outputs on line 10 are added by an adder logic circuit 111 making use of the clock pulse at terminal 9 in the preceding stage, resulting in a demodulated signal at terminal 2 for the input N-phase phase-modulated wave at terminal 1. The timing relationships of the signals in the code reproduce circuit 110 are illustrated in FIG. 5b.

The demodulated signal on line 10 is the same as the demodulated signal obtained by synchronized detection of the input N-phase phase modulated wave. As the adder logic circuit 111, there is illustrated an examples in which a natural binary code series is subjected to binary addition. In this circuit, the reproduced code output on line 10 is applied to one input of an exclusive NOR circuit 121 to obtain an exclusive NOR logic with an output 15 of a one-bit delay circuit 122. The output of the exclusive NOR circuit 121 serves as an output at terminal 2 of the adder logic circuit 111, a part of which is fed to an input of the delay circuit 122. The delay circuit 122 consists of a shift register controlled by the clock pulse 9, in which the rise of the clock signal 9 is adjusted in timing so as to occur just before each bit of the signal at terminal 2 as shown in FIG. 5c which illustrates the timing relationship between the input signal at terminal 2 and the clock signal at terminal 9 of the shift register, whereby the signal on line 15 which is delayed by one bit with respect to the input signal 2 may be obtained. The adder logic circuit 111 shown in FIG. 5a serves as the cumulative adder circuit in which each digit of the input code is added to one preceding digit successively. The cumulative adder is employed in combination with the delayed detector 107. The input phase-modulated wave 1 is demodulated by the delayed detector 107 in the mode of a differential code conversion. Therefore, the demodulated output signal 7 is converted into the mode of the summing code conversion by the cumulative adder 108. As a result, the demodulated signal of the input phase-modulated wave 1 is obtained at the output terminal of the cumulative adder 108 without causing any code conversion.

Again returning to the explanation of FIG. 3, the input N-phase phase-modulated wave 1 is applied not only to the N-phase delayed detector 107 but also to a delay circuit 109, whose delayed output on line 8 is derived after it has been adjusted in timing so that its time slots may coincide with those of the demodulated signal on line 2 along the time axis. This delayed signal on line 8 is inversely modulated in an N-phase phase-modulator 102 so that its modulation may be removed by the demodulated signal on line 2, and thus an unmodulated signal on line 3 may be obtained from the modulator 102. However, since the unmodulated signal on line 3 has disturbances caused by noise, pattern jitters of the modulation signal, etc., it is passed through a narrow-band filter 103 to remove the disturbances, whereby a pure reproduced carrier at terminal 4 may be obtained from the output of said filter 103.

With reference to FIG. 6, the operations of the carrier wave reproducer device according to the above-described embodiment are diagrammatically represented in succession as identified by the same reference numerals as the corresponding parts forming said device, which will be helpful for understanding the aforementioned explanation on the operation principle. In FIG. 6, it will be understood that the output signal 2 of the cumulative adder 108 is obtained by the exclusive NOR function of the signal on the line 10 and the signal on the line 15. One example of the cumulative adder in the prior art is described in U.S. Pat. No. 3,656,150, Column 4, lines 35 to 54.

As described above, according to the carrier wave reproducer device embodying the present invention, owing to the fact that the demodulated output signal to be used for inverse modulation is obtained by means of delayed detector and adder which does not necessitate a reference carrier wave, even if the input signal has a burst form, the input modulated wave can be inversely modulated in a correct manner from its beginning, and accordingly, the time required for establishment of the carrier wave reproduction is short; and further, since a frequency multiplier is not used, the circuit design is simplified.

In the first embodiment of the carrier wave reproducer device as described above with reference to FIG. 3, there is an advantage that the carrier wave can be reproduced without being limited to the case where the input N-phase digital phase-modulated wave comprises a code series having a fixed pattern at the beginning of each burst.

However, in general, a burst form of signal is transmitted with a preamble word having a specific pattern consisting of a relatively simple code series inserted at the beginning thereof. Accordingly, by making use of such a limitation to the input modulated wave, the following modified embodiments have been worked out.

Referring now to FIG. 7 showing a second embodiment of the carrier wave reproducer device according to the present invention, an input N-phase digital phase-modulated wave appearing at terminal 1 is applied to a delayed detector 205 in which it is subjected to delayed detection, and a detector output on line 7 is converted to an original signal in an adder 206 to obtain a demodulated signal on line 2a. As the delayed detector 205, an N-phase delayed detector circuit shown in FIG. 4a can be used for the reception of the N-phase digital phase-modulated wave as is the case with the first embodiment in FIG. 3. However, generally in most cases, the burst signal is transmitted from the transmitter side with a specific pattern consisting of a relatively simple code series inserted as a preamble word signal. For instance, when the beginning of each burst of an input N-phase (N ≥ 2) digital phase-modulated wave at terminal 1 contains a specific code series consisting of only 0°-phase and 180°-phase such as 180°, 0°, 180°, 0°, 180°, 0° ... or 0°, 0°, 180°, 180°, 0°, 0°, 180°, 180°, ..., then said beginning part containing the specific code series can be deemed as a two-phase phase-modulated wave. Similarly, in general, the input N-phase digital phase-modulated wave during the period where a specific pattern consisting of only M kinds of codes, M having a relation with respect to N of N ≥ M (M being a positive integer of two or more), can be regarded as an M-phase digital phase-modulated wave. Accordingly, in order to achieve delayed detection for the input N-phase digital phase-modulated wave 1 in the beginning portion of the burst which can be held to involve M-phase modulation, an M-phase delayed detector circuit can be employed as the delayed detector 205.

Figure 8:
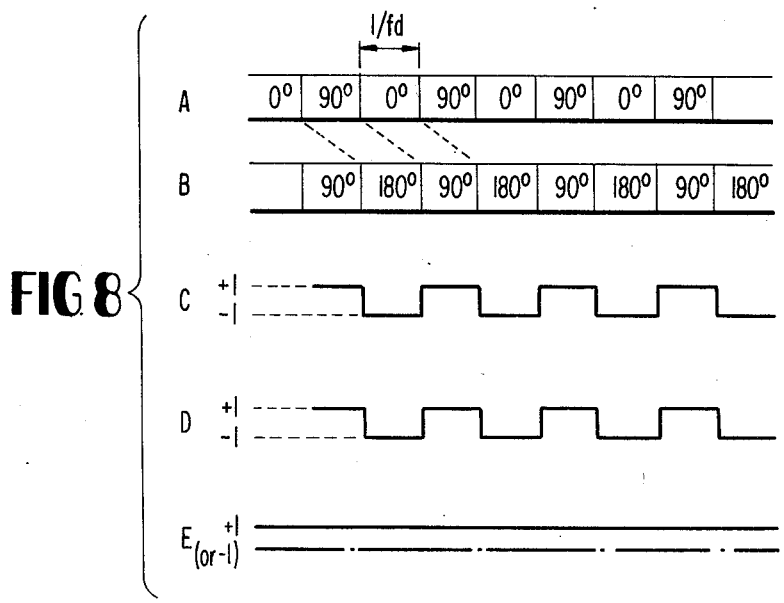
FIG. 8 is a time chart diagrammatically representing the operations of the delayed detector circuit in the carrier wave reproducer device illustrated in FIG. 7.

Explaining now the M-phase delayed detector circuit with reference to FIG. 4a which was used previously for describing the delayed detector circuit 107 in FIG. 3, an input N-phase digital phase-modulated wave at terminal 1 is branched into two signals by means of the signal branching circuit 114, and one of the branched N-phase digital phase-modulated signals is applied to the delay circuit 115 to provide a signal on line 12 delayed for a period of $Td$. This delayed signal on line 12 and the other branched signal on line 11 are fed to the multiplier 116. Here, a carrier wave frequency $fc(H_z)$ of the input N-phase digital phase-modulated wave at terminal 1, a modulation rate $fd(H_z)$ of the input N-phase digital phase-modulated wave, the delay time $Td$, and any arbitrary constant $\theta$ within the region of $0 \leq \theta \leq 2\pi$ are preselected so as to satisfy the following equation (1):

$$2\pi fc\, Td + 2\pi k + \theta \quad (k = 0, \pm 1, \pm 2, \ldots) \qquad (1)$$

where $\pi$ is 180° and $Td$ and $k$ are selected so as to closely approximate $Td$ to $1/fd$. In other words, the phase difference $2\pi fc\, Td$ between the two signals on lines 11 and 12 applied to the multiplier 116, is adjusted in the delay circuit 115 so as to be equal to either $\theta$ or a sum of $\theta$ and an integral multiple of $2\pi$. In a conventional delayed detection system (such as, for example, the embodiment shown in FIG. 3), $\theta$ is preselected to be equal to zero. However, according to the modified embodiment, $\theta$ can be selected at any arbitrary value so as to obtain a desired delayed detector output signal. Describing this operation in more particular, when a two-phase phase detector corresponding to $M = 2$ is employed for the multiplier 116 and the phases at the beginning portion of burst of the input digital phase-modulated wave 1 are, for example, 0°, 0°, 180°, 180°, 0°, 0°, 180°, 180°..., then the output of the multiplier 116 becomes either +1 or −1, and thus this beginning portion can be detected. However, in case of four-phase phase modulation such that in the beginning portion of burst, that is, in the preamble word portion of the input modulated wave at terminal 1, the phases 0° and 90° are alternately repeated for each period of $1/fd$ as shown at A in FIG. 8, if $\theta$ is selected to be equal to zero, then the output of the multiplier 116 becomes zero, and therefore, the preamble word portion cannot be detected. In such a case, if $\theta$ is selected to be equal to 90°, then the output signal on line 12 from the delay circuit 115 takes the pattern as shown at B in FIG. 8, and at the output of the multiplier 116 alternately appear +1 and −1 as shown at C in FIG. 8, whereby a detector signal on line 13 can be obtained. This delayed detector signal on line 13 is, if necessary, passed through a low-pass filter 117 to provide a delayed detector output signal at terminal 7.

It is to be noted that while it is generally more preferable to make $Td$ coincide with $1/fd$, there is no need to make them exactly coincide with each other, and that a little deviation therebetween does not substantially effect the operation of the delayed detector.

Generally, when an M-phase delayed detector circuit is used as the delayed detector 205, an M-nary adder circuit can be used as the adder 206 in FIG. 7. The adder circuit can be realized in a form employing a separately derived clock signal, or else it can be constructed simply in a form employing an analog memory. For instance, in a simple case such that 10101010 ... is converted to 11001100 ..., the adder circuit can be constructed by a binary counter which counted by only an input pulse changed to a "1" from "0". In case of a specific preamble word, that is, in case of a preamble word for a four-phase phase-modulated wave such as shown at A in FIG. 8 and described above, the output of the multiplier 116 in the four-phase delayed detector circuit 205 takes the form shown at C in FIG. 8, in which +1 and −1 are alternately repeated for each period of $1/fd$. By the way, generally, the four-phase demodulated signal corresponding to the modulation signal in which 0° and 90° are alternately repeated has two series of signals, one being a signal in which +1 and −1 are alternately repeated for each period of $1/fd$, the other being a signal which constantly takes a value of either +1 or −1. Accordingly, in the case of such a specific preamble word signal, the adder circuit 206 is only required to emit simply the detector output signal on line 7 from the delayed detector circuit 205 in itself as one output singal and a D.C. signal of +1 (or −1) as the other output signal as illustrated at D and E in FIG. 8. Here, although the output of the adder 206 is indicated by one line 2a), it will be understood that, in the four-phase phase modulation system, its demodulated output is derived from two lines having a series of signals, respectively. The delayed detector 205 and the adder 206 are only needed to perform demodulation at least for the beginning portion of the input N-phase digital phase-modulated wave, for example, only for the preamble word.

Figure 8A:
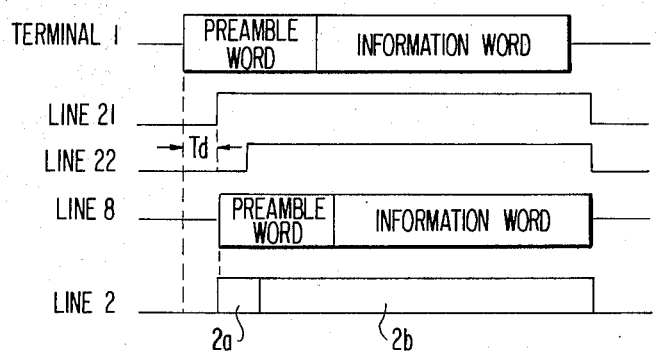
FIG. 8a is a diagrammatic representation of a typical burst signal and timing diagrams representing the development of signals in the operation of the carrier wave reproducer device illustrated in FIG. 7.

Referring again to FIG. 7, if the time required from the application of the input modulated signal up to the establishment of the demodulated signal at the output of the adder 206 is represented by Ta, then the input N-phase digital phase-modulated wave at terminal 1 is delayed in a delay circuit 209 by the period of Ta, so that the modulation signal on the delayed output signal on line 8 and the output signal on line 2a from the adder 206 are brought into time coincidence. The delayed input phase-modulated wave on line 8 is fed both to an N-phase digital phase-demodulator 201 and to an N-phase digital phase modulator 202. On the other hand, the outputs on lines 2a and 2b of the adder 206 and the demodulator 201, respectively, are fed to a switching circuit 207. Referring to FIG. 8a showing the timing diagram relating to the two output signals on lines 2a and 2b, the switching circuit 207 operates to switch in such manner that in response to the application of a control signal on line 21 said switching circuit 207 is switched so as to feed the output on lines 2a of the adder 206 to the modulator 202 as its modulation signal on line 2, while in response to application of another control signal on line 22 said switching circuit 207 is switched so as to feed the output on line 2b of the demodulator 201 to the modulator 202 as its modulation signal one line 2. The control signal on line 21 is a pulse signal representing either the beginning point of the preamble word in the delayed input N-phase digital phase-modulated wave at terminal 1 or any arbitrary time point between the end point of the preceding burst and the beginning point of the next succeeding burst in the same wave. In other words, once a burst has ended, the control signal on line 21 may be produced at any time point between said end point and the beginning point of the next succeeding burst. For instance, the input signal at terminal 1 is subjected to envelope detection by means of an envelope detector 208, and the rise of the output envelope signal is detected for use as the control signal on line 21. The control signal on line 22 is a pulse signal representing the time point when the reproduction of the necessary reference carrier wave at output terminal 4 has been established. For instance, the reproduced carrier wave output from a filter 203 is subjected to envelope detection by means of an envelope detector 210, and the control signal on line 22 is derived from the rise of the output envelope signal. Accordingly, during the period between the control signals on lines 21 and 22, the reproduction of the reference carrier wave at terminal 4 is not fully established, so that the demodulated signal at the output of the phase-demodulator 201 is incomplete.

The switching circuit 207 comprises a switching flip-flop whose state is changed in response to the control signals on lines 21 and 22, and an AND gate having one output of said flip-flop and the demodulated signal on lines 2a applied to its respective inputs, another AND gate having the other output of said flip-flop and the demodulated signal on line 2b applied to its respective inputs, and an OR gate having the outputs of said two AND gates applied to its respective inputs and adapted to emit an output signal on line 2 at its output. Because of the aforementioned construction of the switching circuit 207, during the period when the reference carrier wave at terminal 4 has not been fully established and thus the demodulated signal on line 2b is incomplete, the demodulated signal on line 2a from the adder 206 is emitted as the output signal on line 2, whereas once the reference carrier wave at terminal 4 has been established, the demodulated signal on line 2b from the demodulator circuit 201 is emitted as the output signal on line 2. Consequently, the output signal on line 2 emitted from the switching circuit 207 is correctly demodulated regardless of whether or not the reproduction of the reference carrier wave at terminal 4 has been established. Accordingly, the delayed N-phase digital phase-modulated wave on line 8 is inversely modulated by the demodulated signal on line 2 in the N-phase digital phase-modulator 202 correctly from the very beginning of each burst, and thereby an unmodulated carrier wave on line 3 can be obtained, This unmodulated carrier wave on line 3 is passed through a narrow-band filter 203 such as, for example, a single resonant circuit, a phase synchronizing loop, etc. to suppress the disturbances caused by thermal noises and modulation pattern jitters, and thereby the required reference carrier wave at terminal 4 can be obtained.

According to the embodiment illustrated in FIG. 7 as described above, because of the fact that during the period when the reproduction of the reference carrier wave is not complete, the inverse modulation is achieved by means of the signal demodulated through delayed detection, whereas after the reproduction of the reference carrier wave has been established, the inverse modulation is achieved by means of the signal demodulated through synchronized detection. Even when the input signal is in a burst form, it can be inversely modulated correctly from the very beginning of the reception of said input signal, so that the time required for establishment of the reproduction of the carrier wave becomes shorter than the conventional systems. In addition, when the carrier wave reproducer device in this embodiment is utilized for demodulation in the synchronized detection system, the error factor of the signal demodulated is smaller than the case of the demodulation in delayed detection system.

Figure 9A:
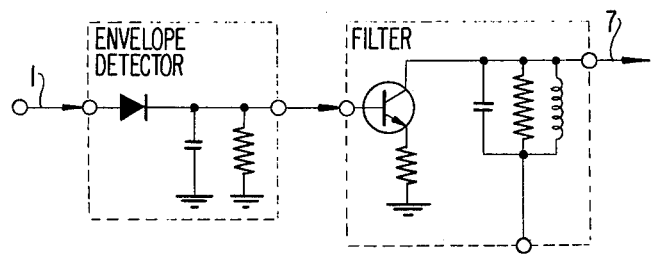
FIGS. 9a, 9b and 9c, respectively, show the clock signal extracting circuit and preamble word generator used in the carrier wave reproducer device illustrated in FIG. 9 and a time chart diagrammatically representing the operations of the preamble word generator illustrated in FIG. 9b.
Figure 9B:
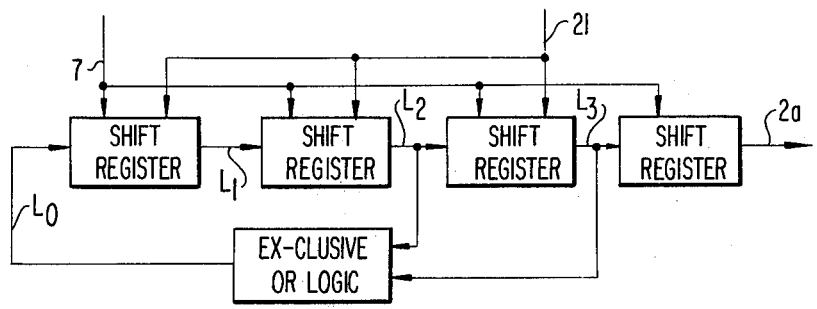
Figure 9C:
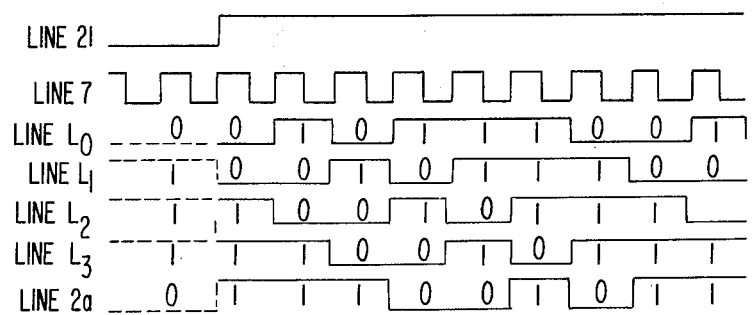

Another modified embodiment which can be applied to the case where the preamble word of the N-phase digital phase-modulated wave comprises a specific pattern consisting of a simple code series, will be described hereinunder with reference to FIG. 9. In the figure, the input N-phase digital phase-modulated wave appearing at terminal 1 is applied to a clock signal extracting circuit 305, in which a clock signal component is extracted. This clock signal extraction can be achieved through the steps of subjecting the input signal to envelope detection and filtering out the clock frequency component from the detector output as shown in FIG. 9a, or else through the steps of converting the input signal into two signals shifted in time by one-half bit from each other, comparing the respective signals in phase, and filtering out the clock frequency from the comparator output in which case a circuit similar to that shown in FIG. 4a could be used. It is assumed that the clock signal extraction can be established after a time Tc has elapsed from the beginning of reception of the input signal. The extracted clock signal 7 is applied to a preamble word generator 306. If the specific pattern for repetition is 1110010, for example, the preamble word generator 306 will be composed of four serially connected one-bit shift registers and an exclusive OR logic circuit having its inputs connected to the second and third shift register outputs and its output connected to the first shift register input. FIG. 9b shows a block diagram of the preamble word generator as described above, and FIG. 9c is a timing diagram representing the signal waveforms at various points of the preamble word generator. The preamble word generator 306 is a well-known device in the communications art, and the type of generator shown in 9b is described, for example, in a book edited by Solomon A. Golomb, entitled DIGITAL COMMUNICATIONS WITH SPACE APPLICATIONS, published by Prentice-Hall, Inc. in 1964, at pages 17 to 20. In the preamble word generator 306, a dummy demodulated signal on line 2a having said specific pattern is generated from the time point of occurrence of the pulse of a control signal on line 21. This signal on line 2a is fed to a switching circuit 307. Switching circuit 307 also receives the demodulated output on line 2b of a N-phase demodulator 301. This switching circuit 307 is similarly constructed and operates in a similar manner to the switching circuit 207 in FIG. 7, in response to the control signals on lines 21 and 22 and feeds the dummy demodulated signal on line 2a as its output signal on line 2 to an N-phase phase modulator 302 during the period when a reference carrier wave at terminal 4 has been not fully established, but once the reference carrier wave has been established it is switched so as to feed the demodulated signal on line 2b as its output signal on line 2 to the N-phase phase modulator 302.

The input N-phase digital phase-modulated wave at terminal 1 is fed to the N-phase phase demodulator 301 and to the N-phase phase modulator 302, respectively, through a delay circuit 309 having delay time Td which satisfies the relation of $Td \geq Tc$. Accordingly, at the leading edge of the burst form of input N-phase digital phase-modulated wave on line 8 delayed through the delay circuit 309, the clock signal output on line 7 from the clock extracting circuit 305 has already been established. The control signal on line 21 is obtained in a detector circuit 308, for example, through the steps of subjecting the input signal at terminal 1 to envelope detection and detecting the rise point of the burst, and its functions to adjust the timing of the dummy demodulated signal on line 2a fed from the preamble word generator 306 so as to be coincident with the fixed pattern inserted in the beginning of the delayed phase-modulated wave on line 8. On the other hand, the control signal on line 22 is generated in a detector circuit 310, when the required reference carrier wave at terminal 4 has been established, for instance, through the steps of subjecting the reference carrier wave at terminal 4 derived from a narrow-band filter 303 to envelope detection and detecting the leading edge of the envelope signal. In response to the control signal on line 21, for instance, a flip-flop in the switching circuit 307 is set, while in response to the control signal on line 22, it is reset, and in this way the switching operation in the switching circuit 307 can be controlled. Subsequently, according to the same function of the circuit arrangement as that described with reference to FIG. 7, a reproduced carrier wave at terminal 4 which is perfectly unmodulated from the very beginning of each burst, can be obtained from the output of the narrow-band filter 303.

Figure 9:
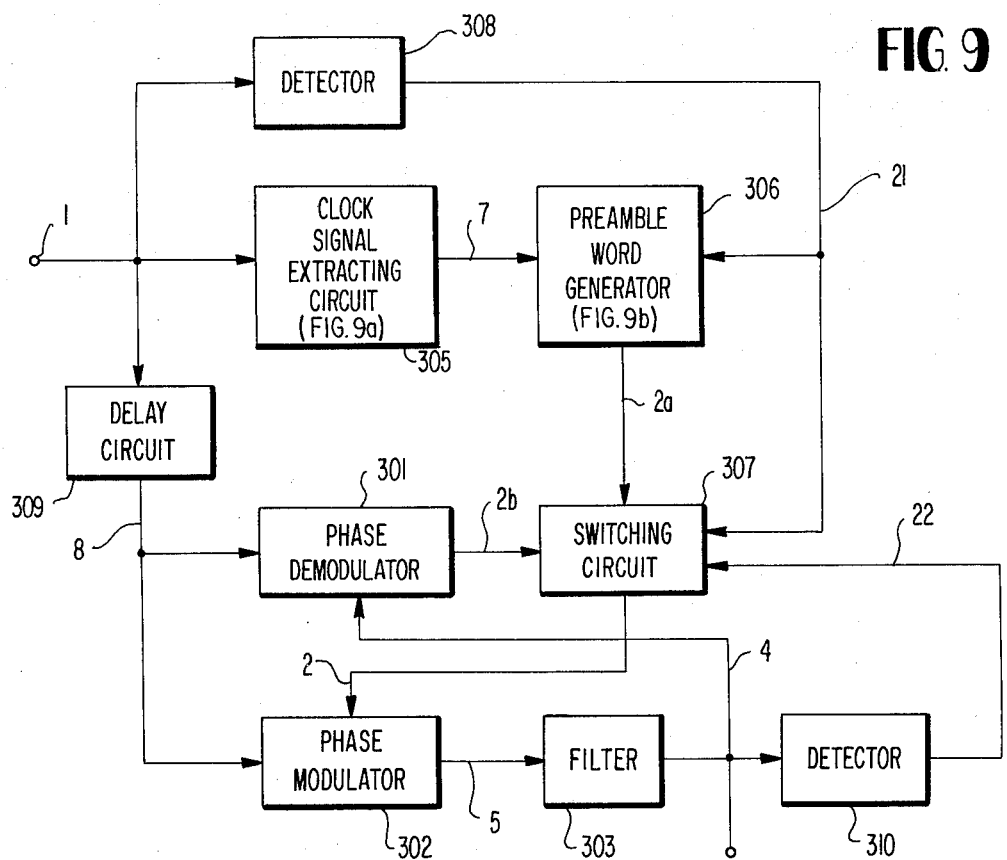
FIG. 9 is a schematic block diagram showing a third embodiment of the carrier wave reproducer device according to the present invention.
Figure 10:
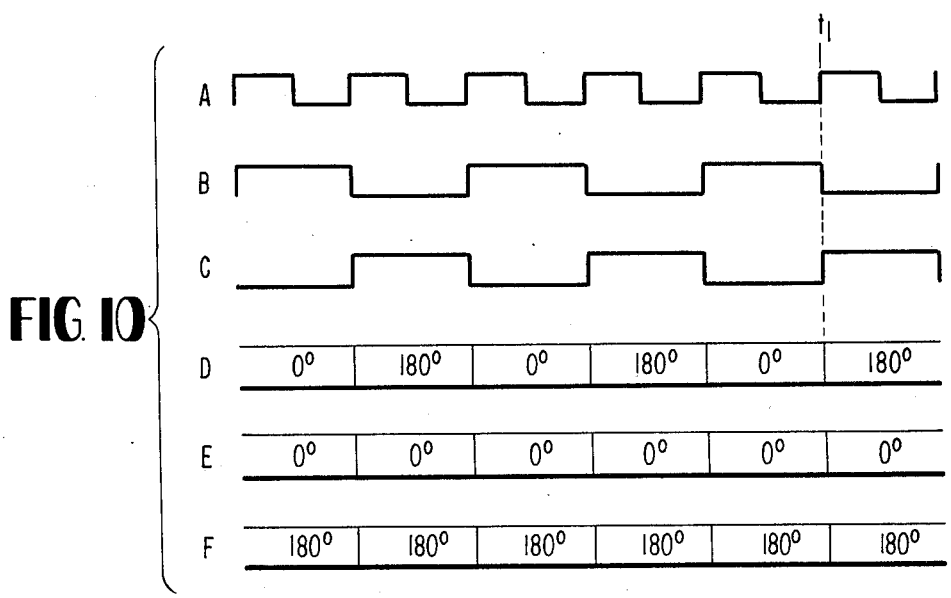
FIG. 10 is a time chart diagrammatically representing the operations of the carrier wave reproducer device illustrated in FIG. 9.

It is to be noted that in the embodiment shown in FIG. 9, if the specific pattern consists of a simple repetition such as, for example, 1010 . . . , then the control signal on line 21 can be omitted. More particularly, with reference to FIG. 10, by way of example the clock signal on line 7 extracted through the clock extracting circuit 305 is represented at A in FIG. 10, and this clock signal is fed to the preamble word generator 306 which consists of a frequency divider including a single stage of flip-flop to be converted into either one of the dummy demodulated signals having opposite polarities to each other as shown at B and C in FIG. 10. On the other hand, the specific pattern in the beginning of the input digital phase-modulated wave at terminal 1 was assumed to be 1010 . . . , and therefore, the phase of the carrier wave is alternately repeated between 0°-phase and 180°-phase as shown at D in FIG. 10. If the signal B in FIG. 10 is employed as the dummy demodulated signal on line 2a, then the inversely modulated output on line 3 from the phase modulator 302 in response to this signal on line 2a becomes a continuous carrier wave having 0°-phase as shown at E in FIG. 10, whereas if the signal C in FIG. 10 is employed as the dummy demodulated signal on line 2a, then the output from the phase modulator 302 becomes a continuous carrier wave having 180°-phase as shown at F in FIG. 10. Obviously, if the phase modulated wave at terminal 1 as shown at D in FIG. 10 is demodulated in the demodulator 301 by means of a reproduced carrier wave of 0°-phase, then a waveform as shown at B in FIG. 10 is obtained, while if it is demodulated by means of a reproduced carrier wave of 180°-phase, then a waveform as shown at C in FIG. 10 is obtained. Therefore, even if switching occurs in the switching circuit 307 at a time point $t_1$ in FIG. 10, the waveform at B or C in FIG. 10 can be continuously fed to the modulator 302. As described, since the circuit arrangement can operate correctly regardless of whether the output of the preamble word generator 306 is the waveform B or C in FIG. 10, the control signal on line 21 may be omitted. In the case that the inserted specific pattern is 11001100 . . . , then it is only necessary to divide the frequency of the extracted clock signal on line 7 by a factor of four in the preamble word generator.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A carrier wave reproducer device for use in the reception of a multi-phase digital phase-modulated wave, comprising delayed detector means for carrying out the delayed detection of said multi-phase digital phase-modulated wave at the input of said device, cumulative adder means connected to the output of said delayed detector means for generating a demodulated signal in response to an output signal from said delayed detector means, delay means for delaying said input phase-modulated wave so that the demodulated output signal from said cumulative adder means and the modulation signal on said input phase-modulated wave are brought into phase coincidence, and phase modulator means for inversely modulating said delayed phase-modulated wave with the output signal from said adder means to reproduce a carrier wave.

2. A carrier wave reproducer device for use in the reception of a multi-phase digital phase-modulated wave as claimed in claim 1 wherein said delayed detector means comprises signal branching means having two outputs for providing two branched signals in phase with each other, second delay means connected to one of the outputs of said signal branching means for delaying the signal at said one output for a predetermined period of time, and multiplier means connected to the other of the outputs of said signal branching means and to the output of said second delay means for comparing the delayed and undelayed outputs of said signal branching means to generate a detector output signal.

3. A carrier wave reproducer device for use in the reception of a multi-phase digital phase-modulated wave as claimed in claim 1 wherein said cumulative adder means comprises threshold means connected to receive the output of said delayed detector means for generating a reproduced code output, logic means connected to receive as one input the output of said threshold means for generating an adder output, and third delay means connected to receive said adder output and for providing a delayed input to said logic means.

4. A carrier wave reproducer device for use in the reception of a multi-phase digital phase-modulated wave as claimed in claim 1, in which said device further comprises phase demodulator means connected to the output of said delay means for demodulating said delayed phase-modulated wave by means of the reproduced carrier wave derived from the output of said phase modulator means, switching means connected to the outputs of said phase demodulator means and said cumulative adder means for alternately applying the demodulated output signal from said phase demodulator means and the demodulated output signal from said cumulative adder means to said phase modulator means for use as an inverse modulation signal, and control means response to said input phase-modulated wave and the output of said phase modulator means for controlling said switching circuit in such manner that at the beginning of reception of said phase-modulated wave in a burst form said phase-modulated wave is inversely modulated with the demodulated output signal from said adder means to reproduce the carrier wave, but after the reproduction of said carrier wave has been established said phase-modulated wave is inversely modulated with the demodulated output signal from said phase demodulator to reproduce said carrier wave.

5. A carrier wave reproducer device for use in the reception of a multi-phase digital phase-modulated wave as claimed in claim 4 wherein said control means comprises first detector means for detecting said multi-phase digital phase-modulated wave at the input of said device to generated a first switching control signal to said switching means, and second detector means connected to the output of said phase modulator means for detecting said reproduced carrier wave to generate a second switching control signal to said switching means.

6. A carrier wave reproducer device for use in the reception of a multi-phase digital phase-modulated wave, comprising clock extracting means for extracting a clock signal component from said multi-phase digital phase-modulated wave at the input of said device, word generator means connected to the output of said clock extracting means for generating a dummy demodulated signal in response to an output signal of said clock extracting means, delay means for delaying said input phase-modulated wave so that the dummy demodulated signal from said word generator means the modulation signal on said input phase-modulated wave is brought into phase coincidence, phase modulator means connected to the output of said delay means for inversely modulating said delayed phase-modulated wave with the output signal from said word generator means to reproduce a carrier wave, phase demodulator means connected to the output of said delay means for demodulating said delayed phase-modulated wave by means of the reproduced carrier wave derived from the output of said phase modulator means, switching means connected to the outputs of said phase demodulator means and said word generator means for alternately applying the demodulated output signal from said phase demodulator means and the dummy demodulated output signal from said word generator means to said phase modulator means for use as an inverse modulation signal, and control means response to said input phase-modulated wave and the output of said phase modulator means for controlling said switching means in such manner that at the beginning of reception of said phase-modulated wave in a burst form said phase-modulated wave is inversely modulated with the dummy demodulated output signal from said word generator means to reproduce the carrier wave, but after the reproduction of said carrier wave has been established said phase-modulated wave is inversely modulated with the demodulated output signal from said phase demodulator means to reproduce said carrier wave.

* * * * *

UNITED STATES PATENT AND TRADEMARK OFFICE
CERTIFICATE OF CORRECTION

PATENT NO. : 3,984,777
DATED : October 5, 1976
INVENTOR(S) : Toshitake Noguchi

It is certified that error appears in the above-identified patent and that said Letters Patent are hereby corrected as shown below:

IN THE SPECIFICATION:

```
Col 3, line 67 - delete "reference8c" insert --reference--
Col 4, line 12 - delete "in" insert --is--
Col 5, line 21 - delete "the" insert --then--
       line 33 - delete "obtain" insert --obtained--
       line 68 - delete "ples " insert --ple--
Col 7, line 49 - before "modulation" insert --phase--
Col 9, line 2  - delete "singal" insert --signal--
       line 38 - delete "one" insert --on--
```

IN THE CLAIMS:

```
Col 13, line 42 - delete "response" insert --responsive--
Col 14, line 23 - after "means" insert --and--
        line 24 - delete "is" insert --are--
        line 40 - delete "response" insert --responsive--
```

Signed and Sealed this

Twenty-second Day of March 1977

[SEAL]

Attest:

RUTH C. MASON
Attesting Officer

C. MARSHALL DANN
Commissioner of Patents and Trademarks